Figure 1:
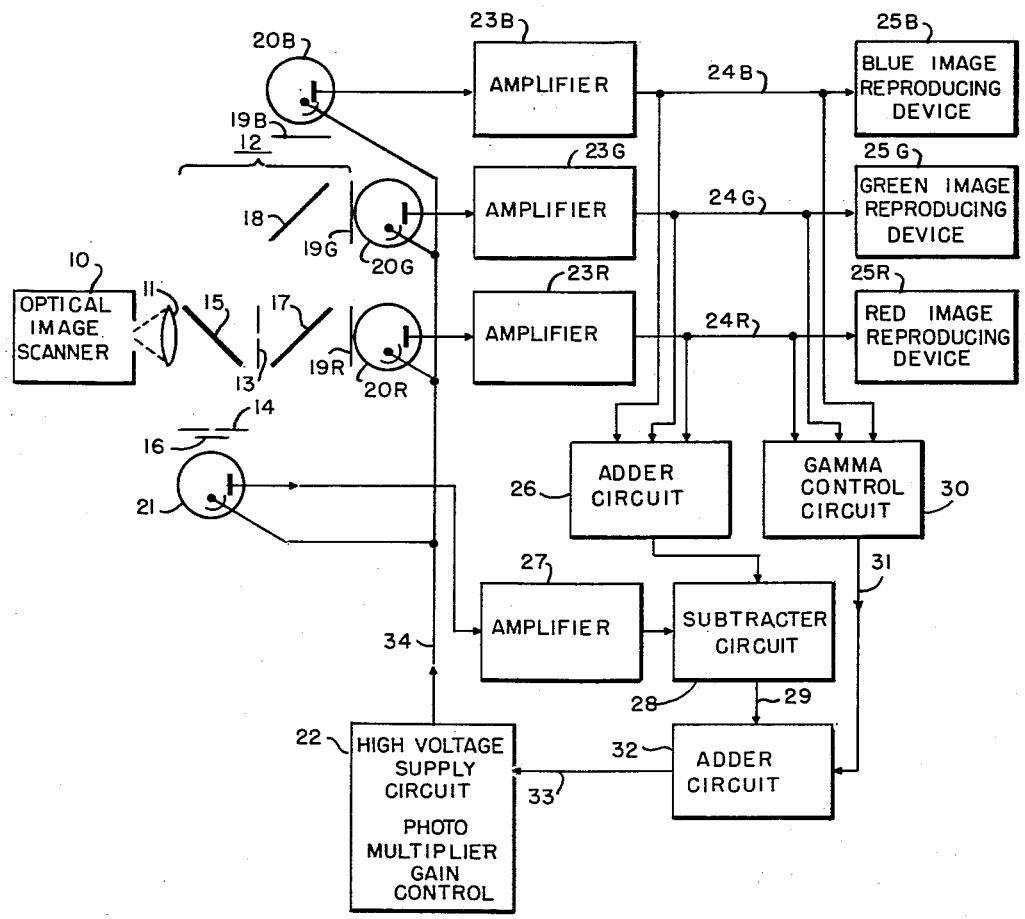

United States Patent Office 2,972,012
Patented Feb. 14, 1961

2,972,012

PHOTOELECTRIC UNSHARP MASKING APPARATUS

Monroe Farber, Jericho, N.Y., assignor to Fairchild Camera and Instrument Corporation, a corporation of Delaware Filed Oct. 9, 1959, Ser. No. 845,451

11 Claims. (Cl. 178—5.2)

This invention relates to photoelectric unsharp masking apparatus and, while it is of general application, it is particularly suitable for developing from a color object a plurality of color-separation-representative signals which, when applied directly or indirectly to an image-reproducing device, develop a color image with sharpened boundaries.

The use of unsharp marsking in photographic processes to sharpen or crispen boundaries in a reproduced image is well known in the art, for example, being described in U.S. Patent No. 2,455,849 to Yule. The term "unsharp masking" is used herein in the same sense as in the Yule patent, namely, the use of image-representative information developed through an unsharp aperture, or equivalent defocusing arrangement, to modify image-representative information developed through a sharp aperture, or equivalent in-focus arrangement. While limited application of analogous techniques to photoelectric image-reproducing systems, both monochrome and color, have heretofore been proposed, such proposed systems have been complex and costly and, when applied to color-reproducing systems, have undesirably affected the color balance.

It is an object of the present invention, therefore, to provide a new and improved photoelectric unsharp masking apparatus suitable for application to a photoelectric engraver of either the monochrome type or of the type developing color-separation negatives or positives.

It is another object of the invention to provide a new and imroved photoelectric unsharp masking apparatus of maximum simplicity and yet capable of producing a marked sharpening of the boundaries in the reproduced image.

It is a further object of the invention to provide a new and improved photoelectric unsharp masking apparatus suitable for application to a photoelectric engraver for producing color-separation negatives or positives which avoids disturbing the correct color balance in the reproduced image.

In accordance with the invention, there is provided in a system for deriving from a color object a plurality of color-separation-representative signals and including means for optically scanning the object to develop one or more light beams representative of the luminance and chrominance of successive elemental areas of the object, a photoelectric unsharp masking apparatus for deriving from such light beam or beams color-separation-representative signals with sharpened boundaries comprising an optical system exposed to the light beam or beams including a sharp aperture and an unsharp aperture for respectively developing a sharp beam and an unsharp beam. The apparatus also comprises beam-splitting means and filter means in the path of such sharp beam for producing a plurality of color-separation beams, a plurality of photoelectric devices individually exposed to the color-separation beams and to the unsharp beam for developing signals individually representative thereof. The apparatus further comprises a plurality of signal channels for individually translating the color-separation-representative signals to an image-reproducing device, means for developing a signal representative of the luminance of the sharp beam, means for differentially combining such luminance signal and the signal representative of the unsharp beam to develop a control signal, and means responsive to such control signal for similarly modifying the outputs of the signal-translating channels to sharpen the boundaries of a reproduced color image without affecting the color balance thereof.

Further in accordance with the invention, there is provided in a system for deriving from an object a signal representative of the luminance of successive elemental areas thereof and including means for optically scanning the object to develop one or more light beams representative of the luminance of successive elemental areas of the object, a photoelectric unsharp masking apparatus for deriving from the light beam or beams luminance representative signals with sharpened boundaries comprising an optical system exposed to the light beam or beams including a sharp aperture and an unsharp aperture for respectively developing a sharp beam and an unsharp beam. The apparatus also comprises first and second photoelectric devices individually exposed to the sharp beam and the unsharp beam respectively for developing signals representative thereof, a signal channel for translating the output of said first photoelectric device to an image-reproducing device, means for differentially combining the developed signals to develop a control signal, and means for feeding back the control signal to the photoelectric devices to modify the output of the signal-translating channel to sharpen the boundaries of the reproduced image.

For a better understanding of the present invention, together with other and further objects thereof, reference is had to the following description taken in connection with the accompanying drawings, while its scope will be pointed out in the appended claims.

Figure 2:
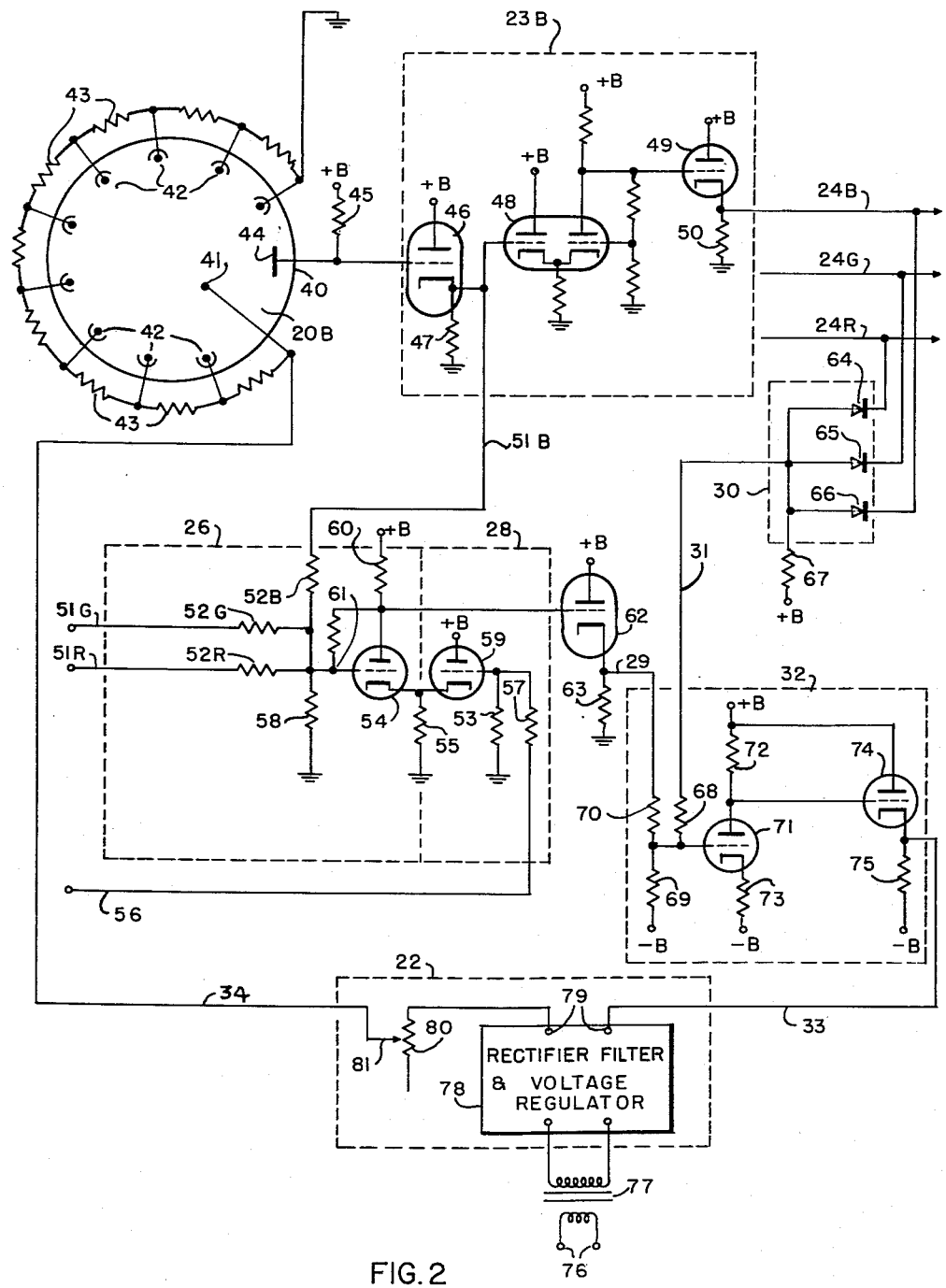

Referring now to the drawings:

Fig. 1 is a schematic representation of a photoelectric unsharp masking apparatus embodying the invention; while Fig. 2 is a schematic circuit diagram of certain elements represented in block form in Fig. 1 and identified by corresponding reference numerals.

Referring now to Fig. 1 of the drawings, there is represented a system for deriving from a color object a plurality of color-separation-representative signals embodying the invention and including means for optically scanning the object to develop one or more light beams representative of the luminance and chrominance of successive elemental areas of the object. This means may comprise the optical image scanner 10 of any well-known type, for example, that described in U.S. Reissue Patent No. 23,914 to Boyajean, for developing a single light beam and focusing it upon an objective lens 11. The system of Fig. 1 also comprises photoelectric apparatus for deriving from such light beam color-separation-representative signals with sharpened boundaries. This apparatus includes an optical system 12 exposed to the light beam from the lens 11 and including a sharp aperture plate 13 and an unsharp aperture plate 14. When the scanning means develops a single light beam, as illustrated, the apparatus also includes beam-splitting means for dividing the light beam between the apertures. In any event, the area of the object illuminated by the scanning beam must be at least as large as the area of the image at the unsharp aperture. This means may be in the form of a conventional half-silvered mirror 15 inclined at 45° to the light from the lens 11 and dividing the light therefrom between the sharp aperture plate 13 and the unsharp aperture plate 14. The objective lens 11 serves to image the object being scanned at planes of the apertures 13 and 14. In the path of the unsharp beam, for example, following the unsharp aperture plate 14, there is disposed a filter means 16 designed to have a spectral transmission characteristic approximating the spectral response characteristic of the eye.

The photoelectric apparatus further includes beam-splitting means and filter means in the path of the sharp beam for producing a plurality of color separation beams. These means may be in the form of well-known dichloric mirrors or, as shown, in the form of half-silvered beam-splitting mirrors 17, 18 and color filters 19B, 19G, 19R arranged as illustrated to divide the light beam from the sharp aperture plate 13 into three beams of equal intensity. The filters 19B, 19G, 19R are designed to have peak spectral transmissions at desired primary colors, for example, red, green, and blue.

The photoelectric apparatus of the invention also includes a plurality of photoelectric devices, such as photomultipliers 20B, 20G, 20R, individually exposed to the filtered color-separation beams and a photomultiplier 21 exposed to the unsharp beam, these photomultipliers developing electrical signals individually representative of the light beams to which they are exposed.

The photoelectric apparatus further includes a high-voltage supply circuit for energizing the dynodes of the photomultipliers, this circuit being included in the unit 22. The unit 22 as well as the other photoelectric devices and the signal-translating circuits shown schematically in Fig. 1 are shown in greater detail in Fig. 2 and will be more specifically described hereinafter. There is provided a plurality of signal channels for individually translating the color-separation-representative signals to an image-reproducing device. These channels are shown schematically in the form of amplifiers 23B, 23G, 23R transmitting signals over the circuits 24B, 24G, 24R to image-reproducing devices 25B, 25G, 25R, respectively.

The photoelectric apparatus includes means for developing a signal representative of the luminance of the sharp beam. This may be in the form of an adder circuit 26 to which are applied portions of the color-separation signals from the channels 24B, 24G, 24R, the portions being representative of the response to the eye of the respective colors to develop a normal luminance signal. For example, the luminance signal may be made up by 6% of the blue signal; 73% of the green signal; and 21% of the red signal. These portions of the color-separation signals are derived from the channels 24B, 24G, 24R and applied to the adder circuit as indicated. The luminance signal from the photomultiplier 21 is also translated through an amplifier 27 and there are provided means for differentially combining the luminance signal from the unsharp beam and that representative of the luminance of the sharp beam, for example, the subtracter circuit 28, to develop a control signal at the output 29 of the circuit 28.

The photoelectric apparatus further includes means responsive to the control signal at the output circuit 29 for similarly modifying the outputs of all of the signal-translating channels to sharpen the boundaries of a reproduced color image without affecting the color balance thereof. In a preferred form, this latter means includes a gamma-control circuti 30 responsive jointly to the peak values of the color-separation signals for developing a second control signal in its output circuit 31. To this end, the unit 30 is conected, as indicated, to the color-separation channels 24B, 24G, 24R in a way as to be responsive only to the peak values of the signals in these circuits.

The photoelectric apparatus further includes circuit means for adding the control signal from the output of subtracter circuit 28 to the output signal of the gamma-control circuit 30 to develop a third control signal. This latter means may be in the form of another adder circuit 32 connected to the output circuits 29 and 31 and having an output circuit 33 at which the third control signal appears. The adder circuit 32 may be like the unit 26 and is described in more detail hereinafter with reference to Fig. 2.

The photoelectric apparatus further includes means for combining the third control signal in the output circuit 33 and the voltage of the high-voltage supply circuit, such means comprising the unit 22, and a circuit 34 for applying the resultant signal to the dynodes of the photomultipliers 20B, 20G, 20R and 21.

Referring now to Fig. 2, there is represented a schematic circuit diagram of the various units shown in block form in Fig. 1, corresponding blocks being identified by the same reference numerals. For simplification only the blue channel is shown in its entirety, since the green and red photomultiplier circuits and signal-translating channels are duplicates of the blue circuits and channel. The photomultiplier 20B, which may be of the type commercially available as 1P21, comprises an evacuated envelope 40 in which is disposed a photocathode 41 upon which the blue color-separation beam impinges and a plurality of dynodes 42 arranged around the inner periphery of the envelope. The photocathode 41 is connected to the output circuit 34 of the unit 22, while the several dynodes 42 are connected to taps of a voltage-divider comprising a string of resistors 43 connected in series between the circuit 34 and ground. The anode 44 of the photomultiplier is connected to a suitable source +B through a load resistor 45. The output signal of the photomultiplier 20B developed across resistor 45 is applied to the control electrode of an amplifier tube 46 having a cathode load resistor 47 so that the amplified color-separation signal from the photomultiplier 20B is developed across a low-impedance circuit for application to the succeeding amplifier tubes 48 and 49 provided with suitable coupling and load resistors which may comprise a conventional cathode-follower amplifier circuit. The final amplifier tube 49 is provided with a cathode load resistor 50 across which is developed the blue color-separation signal applied to the channel 24B. As indicated the amplifier tubes 46, 48, and 49 collectively make up the blue-channel amplifier 23B.

As stated above, the green and red color-separation signals are similarly developed, amplified and applied to the color-separation signal channels 24G and 24R, respectively. The amplified blue color-separation signal from the amplifier 46 is applied by way of a circuit 51B and a voltage divider comprising resistors 52B and 58 to the control electrode of a cathode-follower amplifier tube 54 having a cathode load resistor 55 and an anode load resistor 60. A suitable bias for the control electrode of tube 54 is provided by a voltage-divider comprising resistor 60, a resistor 61, and resistor 58. Similarly, the green and red color-separation signals from the circuits 51G and 51R, respectively, are applied by way of resistors 52G and 52R forming voltage-dividers with the common resistor 58. These elements comprise the adder circuit 26 and constitute a conventional form of adder circuit so that the combined signals are amplified and appear across the cathode load resistor 55 of amplifier 54. The resistors 52B, 52G, 52R and 58 are proportioned so that the portions of the color-separation signals added to form the luminance signal correspond to the respective luminance sensitivities of the eye to these three primary colors.

Similarly, an amplified luminance signal from the unsharp beam responsive photomultiplier tube 21 is applied by way of a circuit 56 and a voltage-divider comprising resistors 57 and 53 to the control electrode of an amplifier tube 59 having as a cathode load the resistor 55 common to the amplifier 54. The amplifier 59 and its associated circuit elements constitute the subtracter circuit 28, but the unsharp luminance signal from the circuit 56 is applied with such polarity that the signal appearing across the load resistor 60 represents the difference between the sharp luminance signal developed in the adder circuit 26 and the unsharp luminance signal and this difference signal is applied to the control electrode of an amplifier 62 having a cathode load resistor 63 representing a low-impedance output circuit for coupling to the adder circuit 32. The amplifier tube 59 and its associated circuit elements thus comprise the subtracter circuit 28.

In order automatically to adjust the gamma of the signals translated in the channels 24B, 24G, 24R, there is provided the gamma-control circuit 30 comprising diodes 64, 65, and 66 connected to the channels 24B, 24G, 24R, respectively, and biased from a suitable source +B by means of a voltage-divider comprising resistors 67, 68, and 69, the bias being effective always to maintain conduction in at least that one of the diodes whose cathode is at any instant most negative. Since the video signals on the channels 24B, 24G, 24R are of negative polarity (increasing negatively with increasing luminance), that video signal of maximum instantaneous value will make its associated diode cathode most negative so that that diode will be conductive. The unit 30 is thus effective to select and translate over the output circuit 31 those portions of the blue, green, and red color-separation signals which from time to time have the maximum instantaneous values. This resultant signal is arithmetically added in the network comprising resistors 68, 69, and 70 to the difference signal from the output 29 of the amplifier 62. The resultant of these two signals is applied to the control electrode of an amplifier 71 having an anode load resistor 72 and a cathode load resistor 73. The amplified resultant signal appearing across resistor 72 is applied to the control electrode of an amplifier tube 74 having a cathode load resistor 75.

Thus, the amplified gain-correction signal is applied to the circuit 33 and thence to the unit 22 for combining with the voltage of the high-voltage supply circuit. The high-voltage supply circuit may be of conventional form and adapted for connection to an ordinary alternating-current supply circuit 76 through a transformer 77 and a conventional rectifier, filter, and voltage regulator unit 78. As shown, the gain-control signal on the circuit 33 is connected directly in series with the output terminals 79 of the unit 78 and in this circuit there is also included an adjustable resistor or attenuator 80, the tap 81 of which is connected to the string of resistors 43 connected to the dynodes of each of the photomultipliers.

Considering now the operation of the unsharp masking apparatus of the invention described above, the general principles involved in sharpening the boundaries of an image reproduced by a monochrome photoelectric reproducing apparatus are explained in German Patent No. 1,039,842 to Rudolf Hell, particularly with reference to Figs. 1–4, inclusive. That patent describes an electronic unsharp masking system for a monochrome photoelectric engraver including a small spot (sharp) scanner and a large spot (unsharp) scanner. The unsharp masking system there described is based upon an optical illusion. Briefly, the patent teaches that an apparent sharpening of the boundaries between areas of widely different tonal values can be achieved in the reproduced image by making the darker areas immediately adjacent the boundary even darker and the lighter areas immediately adjacent and on the other side of the boundary even lighter than these same tonal values are reproduced in areas further removed from the boundaries. That is, on either side of a boundary separating image areas of widely different tonal values, there is produced a narrow strip which accentuates the change in tonal value across the boundary. The human eye accepts such distortion of the image as an apparent increase in the contrast of the reproduced picture. In the Hell system, this result is accomplished by an appropriate combination of electronic signals developed by means of the sharp and unsharp scanners. The present invention comprises a simplified and improved apparatus for applying the basic principles described in the Hell patent to develop a plurality of color-separation signals effective to sharpen the boundaries of a color image reproduced from such signals either directly or by way of color-separation plates, films, or the like, without disturbing the color balance of the reproduced image.

Referring now specifically to the apparatus described above, each of the photomultipliers 20B, 20G, 20R is effective to develop from the respective optical beams of the optical system 12 blue, green, and red color-separation signals which are amplified in the units 23B, 23G, 23R, respectively, and translated to the image-reproducing devices 25B, 25G, 25R in a conventional manner. At the same time, portions of the blue, green, and red color-separation signals are added in the unit 26 to develop a signal representative of the luminance of the sharp beam and this luminance signal differentially combined in the unit 28 with the luminance signal representative of the unsharp beam, the differential signal being amplified in the amplifier 62. The amplified differential signal in the output circuit 29, which may be termed a first control signal, is applied to the input circuit of the adder circuit 32 to which is also applied the gamma-control signal from the unit 30, which may be termed a second control signal. These two control signals are added in the unit 32 to form what may be termed a third control signal which is translated by way of the circuit 33 to be subtracted from the high-voltage supply developed by the unit 78. The latter difference signal is applied by way of the circuit 34 to the dynode strings of the several photomultipliers.

The gain of each of the photomultipliers is a function of its dynode string voltage. As a result, the string voltage is modified when the optical image scanner 10 is scanning the boundary between areas of an image of substantial luminance difference. The operation of the system is to increase the gain of the photomultipliers and, therefore, the amplitude of the color-separation signals on the channels 24B, 24G, 24R, when the scanning beam passes from an area of higher luminance to an area of lower luminance and to decrease the amplitude of these signals just after passing such a boundary. More specifically, when the unsharp scanning beam passes from a higher luminance to a lower luminance area, the signal on the circuit 56 becomes, at first, more positive than that on any of the channels 51B, 51G, 51R, that is, the unsharp signal decreases first. The signal on circuit 29 then becomes more positive and simultaneously the signal on circuit 33 becomes more negative. This means that the high voltage on circuit 34 is also more negative and the gain of the photomultiplier is increased to develop a more negative signal at anode 44 and, therefore, at circuit 24B. This more negative signal represents a signal of greater magnitude since the signal on circuit 24B is of negative polarity.

After the sharp scanning beam has passed to the lower luminance area, the signals on the circuits 51B, 51G, 51R become more positive than that on circuit 56 and the same reasoning gives a more positive signal (or lower magnitude signal). When the unsharp scanning beam no longer includes the boundary between the areas of higher and lower luminance, the signal on the circuit 29 no longer affects the gain of the system.

The result is effectively to increase the luminance gradient of a reproduced image at a boundary between areas of substantially different luminance so that the reproduced image appears to have sharpened boundaries. However, when the scanner 10 is scanning a large area of uniform luminance, the resultant of the two luminance signals differentially combined in the subtracter circuit 28 is zero and there is no modification of the normal three color-separation signals.

The operation of the gamma-control unit 30 responding to that one of the blue, green, and red color-separation signals momentarily of maximum value is to develop a control bias which is included in a negative feedback loop to the photomultipliers and thus compresses the range of amplitude variations of the color-separation signals to a range appropriate to the particular image-reproducing apparatus.

While the unsharp masking apparatus of the invention may be embodied in a wide range of designs, there follow certain of the important design constants and element types:

Tubes:
  46, 48 _____ 12AX7
  54, 59 _____ 12AX7
  49, 62 _____ 12AU7
  71, 74 _____ 6AN8
Diodes: 64, 65, 66 _____ Texas Instrument type 601
Resistors:
  52B _____ 12 megohms.
  52G _____ 1 megohm.
  52R _____ 3.6 megohms.
  53 _____ 1.8 megohms.
  57 _____ 750 kilohms.
  58 _____ 2.4 megohms.
  61 _____ 7.5 megohms.
  68 _____ 2.5 megohms.
  69 _____ 750 kilohms.
  70 _____ 10 megohms.

The photoelectric unsharp-masking apparatus of the invention has so far been described as embodied in a color-image-reproducing system. However, certain of the features described above may be used advantageously in a monochrome image-reproducing system. In such an event, only one of the signal-translating channels and its associated photomultiplier may be used, together with the unsharp photomultiplier and its signal-translating channel, with a corresponding elimination of the adder circuit 26 and the simplification of the gamma-control circuit 30 to respond to the signal of the single monochrome channel.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a system for deriving from a color object a plurality of color-separation-representative signals and including means for optically scanning said object to develop one or more light beams representative of the luminance and chrominance of successive elemental areas of said object, photoelectric unsharp masking apparatus for deriving from said light beam or beams color-separation-representative signals with sharpened boundaries comprising: an optical system exposed to said light beam or beams including a sharp aperture and an unsharp aperture for respectively developing a sharp beam and an unsharp beam and beam-splitting means and filter means in the path of said sharp beam for producing a plurality of color-separation beams; a plurality of photoelectric devices individually exposed to said color-separation beams and to said unsharp beam for developing signals individually representative thereof; a plurality of signal channels for individually translating said color-separation-representative signals to an image-reproducing device; means for developing a signal representative of the luminance of said sharp beam; means for differentially combining said luminance signal and the signal representative of said unsharp beam to develop a control signal; and means responsive to said control signal for similarly modifying the outputs of said signal-translating channels to sharpen the boundaries of a reproduced color image without affecting the color balance thereof.

2. In a system for deriving from a color object a plurality of color-separation-representative signals and including means for optically scanning said object to develop a light beam representative of the luminance and chrominance of successive elemental areas of said object, photoelectric unsharp masking apparatus for deriving from said light beam color-separation-representative signals with sharpened boundaries comprising: an optical system exposed to said light beam including a sharp aperture and an unsharp aperture, beam-splitting means for dividing said light beam between said apertures for respectively developing a sharp beam and an unsharp beam, and beam-splitting means and filter means in the path of said sharp beam for producing a plurality of color-separation beams; a plurality of photoelectric devices individually exposed to said color-separation beams and to said unsharp beam for developing signals individually representative thereof; a plurality of signal channels for individually translating said color-separation-representative signals to an image-reproducing device; means for developing a signal representative of the luminance of said sharp beam; means for differentially combining said luminance signal and the signal representative of said unsharp beam to develop a control signal; and means responsive to said control signal for similarly modifying the signal outputs of said signal-translating channels to sharpen the boundaries of a reproduced color image without affecting the color balance thereof.

3. In a system for deriving from a color object a plurality of color-separation-representative signals and including means for optically scanning said object to develop one or more light beams representative of the luminance and chrominance of successive elemental areas of said object, photoelectric unsharp masking apparatus for deriving from said light beam or beams color-separation-representative signals with sharpened boundaries comprising: an optical system exposed to said light beam or beams including a sharp aperture and an unsharp aperture for respectively developing a sharp beam and an unsharp beam, filter means disposed in the path of said unsharp beam having a spectral transmission characteristic approximating the spectral-response characteristic of the eye, beam-splitting means and filter means in the path of said sharp beam for producing a plurality of color-separation beams, said filter means having peak spectral transmissions at desired primary colors, and a plurality of photoelectric devices individually exposed to said color-separation beams and to said unsharp beam for developing signals individually representative thereof; a plurality of signal channels for individually translating said color-separation-representative signals to an image-reproducing device; means for developing a signal representative of the luminance of said sharp beam; means for differentially combining said luminance signal and the signal representative of said unsharp beam to develop a control signal; and means responsive to said control signal for similarly modifying the signal outputs of said signal-translating channels to sharpen the boundaries of a reproduced color image without affecting the color balance thereof.

4. In a system for deriving from a color object a plurality of color-separation-representative signals and including means for optically scanning said object to develop one or more light beams representative of the luminance and chrominance of successive elemental areas of said object, photoelectric unsharp masking apparatus for deriving from said light beam or beams color-separation-representative signals with sharpened boundaries comprising: an optical system exposed to said light beam or beams including a sharp aperture and an unsharp aperture for respectively developing a sharp beam and an unsharp beam and beam-splitting means and filter means in the path of said sharp beam for producing a plurality of color-separation beams; a plurality of photomultipliers individually exposed to said color-separation beams and to said unsharp beam for developing signals individually representative thereof; a plurality of signal channels for individually translating said color-separation-representative signals to an image-reproducing device; means for developing a signal representative of the luminance of said sharp beam; means for differentially combining said luminance signal and the signal representative of said unsharp beam to develop a control signal; and means for applying said control signal to the dynodes of said photomultipliers to sharpen the boundaries of a reproduced color image without affecting the color balance thereof.

5. In a system for deriving from a color object a plurality of color-separation-representative signals and including means for optically scanning said object to develop one or more light beams representative of the luminance and chrominance of successive elemental areas of said object, photoelectric unsharp masking apparatus for deriving from said light beam or beams color-separation-representative signals with sharpened boundaries comprising: an optical system exposed to said light beam or beams including a sharp aperture and an unsharp aperture for respectively developing a sharp beam and an unsharp beam and beam-splitting means and filter means in the path of said sharp beam for producing a plurality of color-separation beams; a plurality of photoelectric devices individually exposed to said color-separation beams and to said unsharp beam for developing signals individually representative thereof; a plurality of signal channels for individually translating said color-separation-representative signals to an image-reproducing device; an adder circuit; means for applying predetermined portions of said color-separation signals to said adder circuit to develop a signal representative of the luminance of said sharp beam; means for differentially combining said luminance signal and the signal representative of said unsharp beam to develop a control signal; and means responsive to said control signal for similarly modifying the signal outputs of said signal-translating channels to sharpen the boundaries of a reproduced color image without affecting the color balance thereof.

6. In a system for deriving from a color object a plurality of color-separation-representative signals and including means for optically scanning said object to develop one or more light beams representative of the luminance and chrominance of successive elemental areas of said object, photoelectric unsharp masking apparatus for deriving from said light beam or beams color-separation-representative signals with sharpened boundaries comprising: an optical system exposed to said light beam or beams including a sharp aperture and an unsharp aperture for respectively developing a sharp beam and an unsharp beam and beam-splitting means and filter means in the path of said sharp beam for producing a plurality of color-separation beams; a plurality of photoelectric devices individually exposed to said color-separation beams and to said unsharp beam for developing signals individually representative thereof; a plurality of signal channels for individually translating said color-separation-representative signals to an image-reproducing device; an adder circuit; means for applying to said adder circuit portions of said color-separation signals representative of the responses of the eye to the respective colors to develop a signal representative of the luminance of said sharp beam; means for differentially combining said luminance signal and the signal representative of said unsharp beam to develop a control signal; and means responsive to said control signal for similarly modifying the signal outputs of said signal-translating channels to sharpen the boundaries of a reproduced color image without affecting the color balance thereof.

7. In a system for deriving from a color object a plurality of color-separation-representative signals and including means for optically scanning said object to develop one or more light beams representative of the luminance and chrominance of successive elemental areas of said object, photoelectric unsharp masking apparatus for deriving from said light beam or beams color-separation-representative signals with sharpened boundaries comprising: an optical system exposed to said light beam or beams including a sharp aperture and an unsharp aperture for respectively developing a sharp beam and an unsharp beam and beam-splitting means and filter means in the path of said sharp beam for producing a plurality of color-separation beams; a plurality of photoelectric devices individually exposed to said color-separation beams and to said unsharp beam for developing signals individually representative thereof; a plurality of signal channels for individually translating said color-separation-representative signals to an image-reproducing device; means for developing a signal representative of the luminance of said sharp beam; means for differentially combining said luminance signal and the signal representative of said unsharp beam to develop a first control signal; circuit means responsive jointly to the peak values of said color-separation signals for developing a second control signal; circuit means for adding said first and second control signals to develop a third control signal; and means responsive to said third control signal for similarly modifying the signal outputs of said signal-translating channels to sharpen the boundaries of a reproduced color image without affecting the color balance thereof.

8. In a system for deriving from a color object a plurality of color-separation-representative signals and including means for optically scanning said object to develop one or more light beams representative of the luminance and chrominance of successive elemental areas of said object, photoelectric unsharp masking apparatus for deriving from said light beam or beams color-separation-representative signals with sharpened boundaries comprising: an optical system exposed to said light beam or beams including a sharp aperture and an unsharp aperture for respectively developing a sharp beam and an unsharp beam and beam-splitting means and filter means in the path of said sharp beam for producing a plurality of color-separation beams; a plurality of photomultipliers individually exposed to said color-separation beams and to said unsharp beam for developing signals individually representative thereof; a high-voltage supply circuit for energizing the dynodes of said photomultipliers; a plurality of signal channels for individually translating said color-separation-representative signals to an image-reproducing device; means for developing a signal representative of the luminance of said sharp beam; means for differentially combining said luminance signal and the signal representative of said unsharp beam to develop a control signal; and means for combining said control signal and the voltage of said supply circuit and applying the resultant to the dynodes of said photomultipliers to sharpen the boundaries of a reproduced color image without affecting the color balance thereof.

9. In a system for deriving from an object a signal representative of the luminance of successive elemental areas thereof and including means for optically scanning said object to develop one or more light beams representative of the luminance of successive elemental areas of said object, photoelectric unsharp masking apparatus for deriving from said light beam or beams luminance representative signals with sharpened boundaries comprising: an optical system exposed to said light beam or beams including a sharp aperture and an unsharp aperture for respectively developing a sharp beam and an unsharp beam; first and second photoelectric devices individually exposed to said sharp beam and said unsharp beam respectively for developing signals representative thereof; a signal channel for translating the output of said first photoelectric device to an image-reproducing device; means for differentially combining said signals to develop a control signal; and means for feeding back said control signal to said photoelectric devices to modify the output of said signal-translating channel to sharpen the boundaries of a reproduced image.

10. In a system for deriving from an object a signal representative of the luminance of successive elemental areas thereof and including means for optically scanning said object to develop one or more light beams representative of the luminance of successive elemental areas of said object, photoelectric unsharp masking apparatus for deriving from said light beam or beams luminance representative signals with sharpened boundaries comprising: an optical system exposed to said light beam or beams including a sharp aperture and an unsharp aperture for respectively developing a sharp beam and an unsharp beam; first and second photomultipliers individually exposed to said sharp beam and said unsharp beam respectively for developing signals representative thereof; a signal channel for translating the output of said first photomultiplier to an image-reproducing device; means for differentially combining said signals to develop a control signal; and means for feeding back said control signal to the dynodes of said photomultipliers to modify the output of said signal-translating channel to sharpen the boundaries of a reproduced image.

11. In a system for deriving from an object a signal representative of the luminance of successive elemental areas thereof and including means for optically scanning said object to develop a light beam representative of the luminance of successive elemental areas of said object, photoelectric unsharp masking apparatus for deriving from said light beam luminance representative signals with sharpened boundaries comprising: an optical system exposed to said light beam including a sharp aperture and an unsharp aperture for respectively developing a sharp beam and an unsharp beam and beam-splitting means for dividing said light beam between said apertures; first and second photoelectric devices individually exposed to said sharp beam and said unsharp beam respectively for developing signals representative thereof; a signal channel for translating the output of said first photoelectric device to an image-reproducing device; means for differentially combining said signals to develop a control signal; and means for feeding back said control signal to said photoelectric devices to modify the output of said signal-translating channel to sharpen the boundaries of a reproduced image.

References Cited in the file of this patent
UNITED STATES PATENTS

| | | |
|---|---|---|
| 2,548,829 | Szikilai | Apr. 10, 1951 |
| 2,691,696 | Yule | Oct. 12, 1954 |
| 2,865,984 | Moe | Dec. 23, 1958 |
| 2,880,270 | Hell | Mar. 31, 1959 |